US010189712B2

(12) United States Patent
Bass et al.

(10) Patent No.: US 10,189,712 B2
(45) Date of Patent: Jan. 29, 2019

(54) OXIDATION OF POROUS, CARBON-CONTAINING MATERIALS USING FUEL AND OXIDIZING AGENT (71) Applicant: International Business Machines Corporation, Armonk, NY (US)

(72) Inventors: John D. Bass, Union City, CA (US); Robert D. Miller, Los Gatos, CA (US); Bobby E. Feller, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 642 days.

(21) Appl. No.: 13/838,215

(22) Filed: Mar. 15, 2013

(65) Prior Publication Data

US 2014/0272196 A1  Sep. 18, 2014

(51) Int. Cl.
 *B05D 3/02* (2006.01)
 *C01B 31/00* (2006.01)

(52) U.S. Cl.
 CPC .................................. *C01B 31/00* (2013.01)

(58) Field of Classification Search
 CPC .......................... B05D 3/107; H01L 21/02134
 See application file for complete search history.

(56) References Cited

U.S. PATENT DOCUMENTS

| 4,770,713 | A  | 9/1988  | Ward         |
| 5,279,771 | A  | 1/1994  | Lee          |
| 5,417,877 | A  | 5/1995  | Ward         |
| 5,419,779 | A  | 5/1995  | Ward         |
| 5,597,420 | A  | 1/1997  | Ward         |
| 5,997,658 | A  | 12/1999 | Peters et al.|
| 6,677,286 | B1 | 1/2004  | Rovito et al.|
| 6,828,289 | B2 | 12/2004 | Peters et al.|
| 6,943,141 | B2 | 9/2005  | O'Brien      |

(Continued)

FOREIGN PATENT DOCUMENTS

JP         2004161896 A      6/2004

OTHER PUBLICATIONS

Chua et al., "Spin-on-polymer methylsilsesquioxane for sub-micron intermetal dielectric application," Journal of materials science letters, Sep. 1999. 18(17): 1437-1439.

(Continued)

*Primary Examiner* — Dah-Wei D. Yuan
*Assistant Examiner* — Nga Leung V Law
(74) *Attorney, Agent, or Firm* — Shumaker & Sieffert, P.A.

(57) ABSTRACT

A method may include exposing a porous, carbon-containing material to a fuel source and an oxidizing agent; allowing the porous, carbon-containing material to adsorb at least some of the fuel source; and heating the porous, carbon-containing material to a temperature at which combustion of the adsorbed fuel source occurs, so that the porous, carbon-containing material is homogeneously oxidized throughout its thickness. Another method may include exposing a microporous, carbon-containing material to a fuel and an oxidizing agent, allowing the microporous, carbon-containing material to adsorb at least some of the fuel, and heating the microporous, carbon-containing material to a temperature at which combustion of the fuel occurs, to seal pores of the microporous, carbon-containing material adjacent to its surface.

21 Claims, 11 Drawing Sheets

(56) References Cited

U.S. PATENT DOCUMENTS

| | | | |
|---|---|---|---|
| 6,943,142 | B2 | 9/2005 | Egbe et al. |
| 6,951,710 | B2 | 10/2005 | Rieker et al. |
| 2001/0038919 | A1* | 11/2001 | Berry et al. .................. 428/446 |
| 2004/0063042 | A1 | 4/2004 | Egbe |
| 2005/0119143 | A1 | 6/2005 | Egbe et al. |
| 2005/0196974 | A1 | 9/2005 | Weigel et al. |
| 2006/0003910 | A1 | 1/2006 | Hsu et al. |
| 2006/0014656 | A1 | 1/2006 | Egbe et al. |
| 2006/0016785 | A1 | 1/2006 | Egbe et al. |
| 2007/0231559 | A1* | 10/2007 | Kim ........................ B82Y 5/00 428/315.7 |
| 2007/0299239 | A1 | 12/2007 | Weigel et al. |
| 2008/0199977 | A1 | 8/2008 | Weigel et al. |
| 2009/0032901 | A1* | 2/2009 | Chen et al. ................... 257/510 |
| 2010/0151206 | A1* | 6/2010 | Wu ....................... C23C 16/401 428/158 |
| 2011/0201212 | A1* | 8/2011 | Yamamoto et al. .......... 438/789 |

OTHER PUBLICATIONS

Maddalon et al., "Planarization properties of hydrogen silsesquioxane (HSQ) influence on CMP," Microelectronic engineering, Jan. 2000. 50(1-4): 33-40.

Padovani et al., "Porous methylsilsesquioxane for low-k dielectric applications," Electrochemical and Solid-State Letters, 2001. 4(11): F25-F28 (available electronically Aug. 24, 2001).

Schmid et al., "Nonaqueous development of silsesquioxane electron beam resist." Journal of Vacuum Science & Technology B: Microelectronics and Nanometer Structures, 2004. 22(6): 3497-3502 (available electronically Dec. 14, 2004).

Turri et al., "Wettability of polyhedral oligomeric silsesquioxane nanostructured polymer surfaces," Macromolecular rapid communications, Aug. 2005. 26(15): 1233-1236.

Hu et al., Tailoring of the nanotexture of mesoporous silica films and their functionalized derivatives for selectively harvesting low molecular weight protein. ACS Nano, Dec. 2009. 4(1): 439-451.

Bass et al., "Stability of mesoporous oxide and mixed metal oxide materials under biologically relevant conditions," Chemistry of Materials, Jul. 2007. 19(17): 4349-4356.

Kim et al., "Nanoporous thin films with hydrophilicity-contrasted patterns," Chemistry of Materials, Oct. 2004. 16(22): 4267-4272.

Singh et al., "Resisting oxygen plasma damage in low-k hydrogen silsesquioxane films by hydrogen plasma treatment," Materials Letters, Jun. 2006. 60(13-14): 1579-1581.

Sun et al.,"Depth-profiling plasma-induced densification of porous low-k thin films using positronium annihilation lifetime spectroscopy," Applied Physics Letters, Aug. 2002. 81(8): 1447-1449.

Iijima et al., "BEOL integration of highly damage-resistant porous ultra low-k material using direct CMP and via-first process," IEEE International Interconnect Technology Conference, Jun. 5-7, 2006, pp. 21-23.

Karimi et al., "Palladium containing periodic mesoporous organosilica with imidazolium framework (Pd@PMO-IL): an efficient and recyclable catalyst for the aerobic oxidation of alcohols," Org. Biomol. Chem. Nov. 2011, 9: 7420-7426 (available electronically Sep. 8, 2011).

Lee et al. "A technique for converting perhydropolysilazane to SiOx at low temperature," Electrochemical and Solid-State Letters, 13(1): H23-H25, Jan. 2010.

Maex et al., "Low dielectric constant materials for microelectrics," Journal of Applied Physics, vol. 93, No. 11, pp. 8793-8841, Jun. 1, 2003.

Ouyang et al., "Conversion of some siloxane polymers to silicon oxide by UV/ozone photochemical processes," Chem. Mater May 2000(12): 1591-1596.

\* cited by examiner

OXIDATION OF POROUS, CARBON-CONTAINING MATERIALS USING FUEL AND OXIDIZING AGENT

TECHNICAL FIELD

The disclosure relates to techniques for oxidizing porous, carbon-containing materials.

BACKGROUND

Porous, carbon-containing materials are used in a wide variety of products, and include a wide variety of classes of materials. Silsesquioxanes are one type of porous, carbon-containing material. Silsesquioxanes are used in a wide range of applications, particularly in the microelectronics industry. For example, spin-on-dielectrics based on silsesquioxanes are used for gap filling and planarization. With the addition of a sacrificial porogen, these silsesquioxanes can be made porous to reduce the dielectric constant for low k applications, e.g., compared to nonporous silsesquioxanes. Hydrogen silsesquioxane is a resist used for e-beam lithography. Due to the expansive number of areas where silsesquioxanes are used, processes that can modify these materials in a controllable fashion are valuable.

Many applications require that silsesquioxanes are cured following casting the silsesquioxiane, e.g., as a film. In the microelectronics industry, the sorption of water can cause current leakage and damage to sensitive electronics. Therefore, curing of silsesquioxanes used in microelectronics may occur in inert environments, where the cured silsesquioxane is rendered hydrophobic. Unfortunately, porous silsesquioxane films generated in this manner are incompatible with aqueous solution applications, as the surface is too hydrophobic to fill with water.

Recently, porous, oxide-based thin films prepared by a sol-gel process have been used to enhance the detection of low molecular weight proteins in the serum. Porous films prepared in this manner using tetra alkoxy silanes yield hydrophilic films compatible with aqueous media. However, these solution formulations are inherently chemically unstable, including under physiologically relevant conditions. Silsesquioxanes have been designed for stability and some formulations can be stable for months under suitable conditions.

SUMMARY

The disclosure describes techniques for oxidizing a porous, carbon-containing material. In some examples, such as when the porous, carbon-containing material includes a mesoporous structure the techniques result in a substantially homogeneously oxidized, porous, carbon-containing material at full or intermediate levels of oxidation. In other examples, such as when the porous, carbon-containing material includes a microporous structure, the techniques result in a microporous, carbon-containing material in which micropores adjacent to a surface of the microporous, carbon-containing material are sealed.

The techniques may include curing the porous, carbon-containing material in an environment that includes a fuel and an oxidizer. In some examples, the porous, carbon-containing material may include a silsesquioxane. The fuel may include, for example, hydrogen, a hydrocarbon, an ether, an alcohol, a ketone, or an aldehyde, and the oxidizer may include oxygen or nitrous oxide.

In one example, the disclosure describes a method that includes exposing a porous, carbon-containing material to a fuel source and an oxidizer; allowing the porous, carbon-containing material to adsorb at least some of the fuel source; and heating the porous, carbon-containing material to a temperature at which combustion of the adsorbed fuel source occurs, so that the porous, carbon-containing material is homogeneously oxidized throughout its thickness.

In another example, the disclosure describes a method that includes exposing a silsesquioxane to a hydrocarbon and an oxidizer; allowing the silsesquioxane to adsorb at least some of the hydrocarbon; heating the silsesquioxane to a temperature at which combustion of the adsorbed hydrocarbon occurs; cooling the heated silsesquioxane to control the extent of combustion; and repeating the heating and cooling of the silsesquioxane to promote uniform reactant distribution throughout the silsesquioxane, so that the silsesquioxane is homogeneously oxidized throughout its thickness.

In an additional example, the disclosure describes a method that includes exposing a microporous, carbon-containing material to a fuel and an oxidizing agent, allowing the microporous, carbon-containing material to adsorb at least some of the fuel, and heating the microporous, carbon-containing material to a temperature at which combustion of the fuel occurs, to seal pores of the microporous, carbon-containing material adjacent to its surface.

The details of one or more examples are set forth in the accompanying drawings and the description below. Other features, objects, and advantages will be apparent from the description and drawings, and from the claims.

DETAILED DESCRIPTION

The disclosure describes techniques for oxidizing a porous, carbon-containing material. In some applications, a UV/ozone treatment or an oxygen plasma treatment may be used to render porous, carbon-containing materials, such as silsesquioxane-based materials, more hydrophilic. Both of these methods generate reactive species in the gas phase that oxidize the porous, carbon-containing material. Because the reactive species are generated in the gas phase, the reactive species have a higher probability of reacting with the outer surface of the porous, carbon-containing material relative to the interior of porous, carbon-containing material, within a pore. This leads to an extremely non-uniform modification throughout the depth (e.g., thickness) of the material, which may be a problem in some applications. For example, oxygen plasma processing has been shown by secondary ion mass spectroscopy (SIMS) to decrease the carbon content of a film by 2 to 3 orders of magnitude relative to carbon content at an interior of the film. Maex, K.; Baklanov, M.; Shamiryan, D.; Brongersma, S.; Yanovitskaya, Z., Low dielectric constant materials for microelectronics. *Journal of Applied Physics* 2003, 93, 8793.

The only known way to generate a uniformly oxidized material from these processes would be to drive the oxidation to completion; however, that may damage the porous, carbon-containing material and make the material unstable in some environments. For example, completely oxidizing a silsesquioxane-based material using a UV/ozone treatment may make the silsesquioxane-based material unstable in aqueous environments, particularly at pH values greater than 7.

This disclosure describes techniques for oxidizing porous, carbon-containing materials. In some examples, the techniques facilitate oxidizing porous, carbon-containing materials at full or intermediate levels of oxidation.

In some examples, the techniques described herein may be applied to mesoporous, carbon-containing materials. According to the International Union of Pure and Applied Chemistry (IUPAC), mesoporous is defined as pore sizes between 2 nanometers (nm) and 50 nm. When applied to mesoporous, carbon-containing materials, the techniques described herein may substantially uniformly oxidize the porous, carbon-containing material. As used herein "substantially uniformly oxidized" or "substantially homogeneously oxidized" is used to refer to a film in which the carbon content varies by no more than a factor of 10 throughout its thickness. In other words, within the film, the lowest concentration of carbon is within a factor of 10 of the highest concentration of carbon. In some examples, the carbon concentration may vary by less than a factor of 5 or even less than a factor of 2 within the film. Additionally, in some examples, the techniques described herein may produce materials that may be stable in aqueous environments, including those having pH values greater than 7. The techniques include curing the porous, carbon-containing material in an environment that includes a fuel and an oxidizing agent.

In other examples, techniques described herein may be used to oxidize microporous, carbon-containing materials. According to the IUPAC, microporous is defined as pore sizes less than 1 nm. When the techniques described herein are applied to microporous, carbon-containing materials, sealing of pores adjacent to a surface of the material occurs.

In some examples, the porous, carbon-containing material may include a porous, organosilicate material. The porous, organosilicate material may, for example, be selected from the group consisting of silsesquioxanes, silicates, siloxanes, crosslinked siloxanes, carbosilanes, crosslinked carbosilanes, and cyclic siloxanes. In some examples, the porous, organosilicate material is a silsesquioxane-based material.

The porous, carbon-containing material may be a film in some examples. The thickness of the film up to about several micrometers, such as up to about 1 micrometer, or hundreds of nanometers. In some instances, the porous, carbon-containing material may be a thin film, which may have a thickness between several nanometers and several microns.

In some examples, the fuel may be selected from the group consisting of hydrogen, hydrocarbons, aliphatic ethers, alkyl aryl ethers, alcohols, ketones, and aldehydes. Hydrocarbons that can be used for the fuel include alkyls, branched alkyls, cycloalkyls, aromatics, substituted aromatics, and polycyclic aromatics. In some examples, the fuel includes octane.

Oxidizing porous, carbon-containing materials using the techniques described in this disclosure may render the porous, carbon-containing materials hydrophilic. For example, silsesquioxane films cured in house air (primarily a mixture of nitrogen and oxygen) were relatively hydrophobic. For both dense and porous silsesquioxane films, the contact angle of water on a bulk surface of the film was about 100 degrees. By adding as little as 0.025% air by volume saturated with octane and treating at 450° C., the contact angle between water and the bulk surface of the film dropped to 14 degrees and 0 degrees for the dense and porous films, respectively, with essentially no change in the refractive index of the silsesquioxane films compared to the films cured in house air.

Rendering porous, carbon-containing materials hydrophilic permits their use in applications that require hydrophilic properties. For example, the porous, carbon-containing materials may be used to enhance the detection of low molecular weight proteins in the serum. As another example, the techniques described herein may increase the modulus of the porous, carbon-containing materials, which may allow use of the porous, carbon-containing materials in applications where cracking of lower modulus porous, carbon-containing materials is problematic.

Compared to alternative methods of creating hydrophilic films from porous, carbon-containing materials, such as UV/ozone oxidation and $O_2$ plasma oxidation, the techniques described herein may, in some examples, be simpler, less expensive, and more reproducible. Unlike UV/ozone oxidation and $O_2$ plasma oxidation, the techniques described herein require less costly equipment, making the techniques compatible with high throughput batch processes. Further, unlike UV/ozone oxidation and $O_2$ plasma oxidation, which have been shown to damage the materials being oxidized, cause non-uniformities throughout the film, and lead to instability in aqueous solution, the techniques described herein may mitigate at least some of these problems. For instance, materials prepared using the techniques described herein have shown stability at physiological pH. Further, porous, carbon-containing materials oxidized using the techniques described herein may be further modified using standard silane chemistry.

Figure 1:
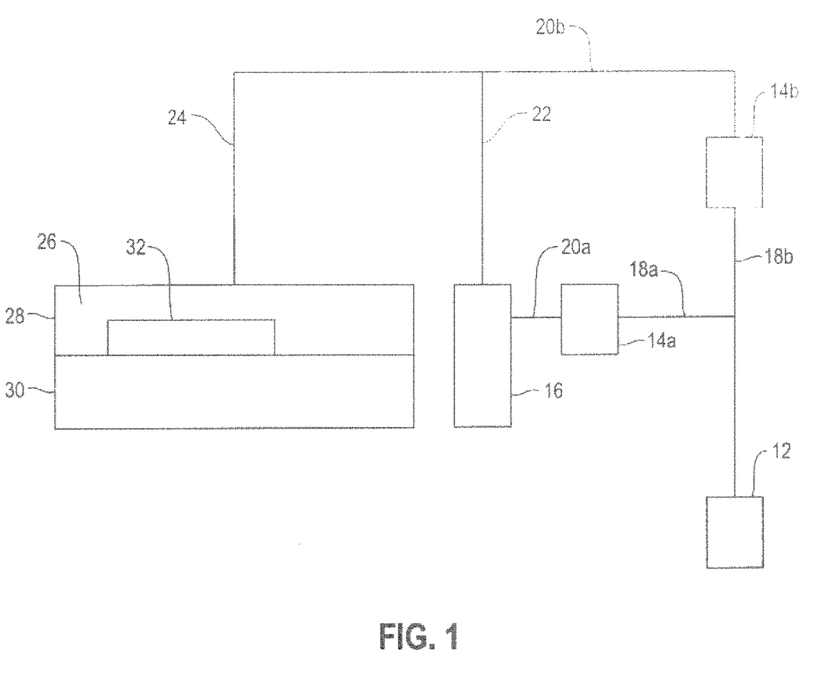
FIG. 1 is a block diagram illustrating an example of a system for oxidizing a porous, carbon-containing material.

FIG. 1 is a block diagram illustrating an example of a system for oxidizing a porous, carbon-containing material. The porous, carbon-containing material may be either microporous or mesoporous. The system of FIG. 1 includes an air source 12, a first flow controller 14a, a second flow controller 14b, a fuel source 16, a sample container 28, and a heat source 30. In other examples, a system for performing the techniques of the disclosure may include additional components, fewer components, or different components.

Air source 12 provides pressurized air to the system. In some examples, oxygen provided in the pressurized air is the oxidizing agent for the techniques described herein. In other examples, the oxidizing agent may be nitrous oxide or a combination of oxygen and nitrous oxide.

Air source 12 provides the pressurized air to the first flow controller 14a and the second flow controller 14b through first flow controller inlet 18a and second flow controller inlet 18b, respectively. First flow controller 14a and second flow controller 14b allow independent control of the flow rates of pressurized air through first flow controller outlet 20a and second flow controller outlet 20b, respectively. In some examples, first flow controller 14a and second flow controller 14b (collectively, "flow controllers 14") comprise mass flow controllers.

First flow controller outlet 20a fluidly connects to a fuel source 16. Fuel source 16 provides fuel into the pressurized air flowing through fuel source 16. In some examples, fuel source 16 includes a bubbler that contains a liquid form of the fuel. The pressurized air may flow through the bubbler and be saturated with fuel vapor. In other examples, fuel vapor may be introduced into the pressurized air flowing through fuel source 16 via other mechanisms.

Fuel source 16 may be used to deliver any one or more of a variety of fuels into the pressurized air. In some examples, the fuel may include a hydrocarbon, such as alkyl, branched alkyl, cycloalkyl, aromatic, substituted aromatic, polycyclic aromatic. For example, the fuel may include octane. In other examples, the fuel may include an aliphatic ether, an alkyl aryl ether, an alcohol, a ketone, and/or an aldehyde. In some examples, the fuel may be selected from the group consisting of hydrogen, alkyls, branched alkyls, cycloalkyls, aromatics, substituted aromatics, polycyclic aromatics, aliphatic ethers, alkyl aryl ethers, alcohols, ketones, and aldehydes.

An outlet of fuel source 16 is fluidly connected to fuel source outlet 22. Fuel source outlet 22 and second flow controller outlet 20b recombine in sample container inlet 24. Second flow controller outlet 20b contains only pressurized air. Hence, by controlling relative flow rates through first flow controller 14a and second flow controller 14b, the concentration of fuel in the recombined stream fed through sample container inlet 24 to the sample container 28 may be controlled.

Sample container 28 defines a cavity 26, in which a porous, carbon-containing material 32 is disposed. Sample container 28 is disposed near to or adjacent to a heat source 30. Heat source 30 provides heat to sample container 28 to heat porous, carbon-containing material 32. In some implementations, heat source 30 may be electronically controlled to allow thermal cycling of porous, carbon-containing material 32. In some examples, heat source 30 is a conductive heat source, a convective heat source, or a radiative heat source. For example, heat source 30 may include an apparatus that heats porous, carbon-containing material 32 using radiation, ultrasonication, or laser heating. In an example, heat source 30 may be a hot plate or other conductive heating mechanism.

Porous, carbon-containing material 32 is a material that is oxidized using the system. Porous, carbon-containing material 32 may be a microporous material or a mesoporous material. In some examples, porous carbon-containing material 32 includes a porous, organosilicate material. Examples of porous, organosilicate materials include silsesquioxanes, silicates, siloxanes, crosslinked siloxanes, carbosilanes, crosslinked carbosilanes, and cyclic siloxanes. In some examples, the porous, organosilicate material may include a substituent selected from the group consisting of hydrogen, alkyl, branched alkyl, cycloalkyl, aromatic, substituted aromatic, polycyclic aromatic, and vinyl.

Figure 2:
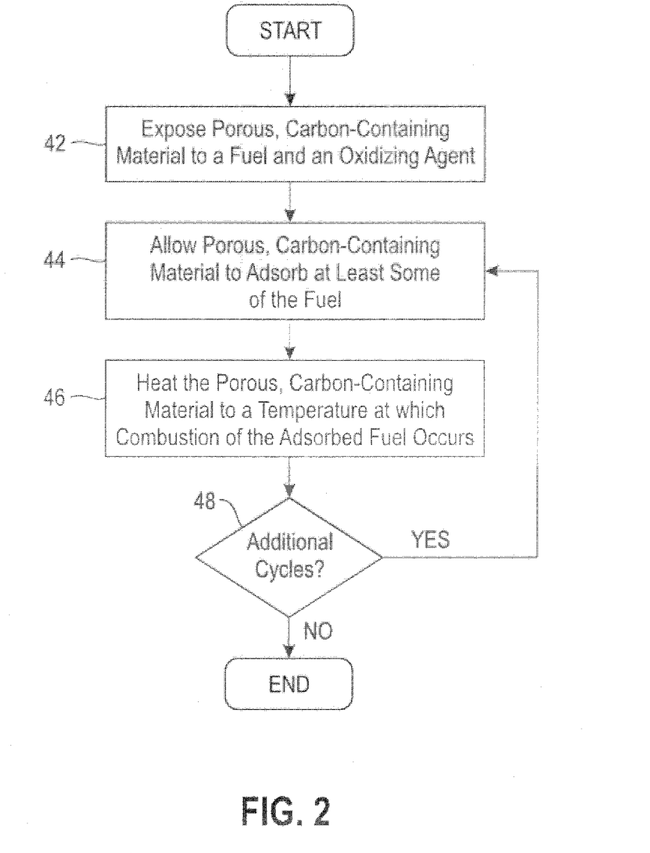
FIG. 2 is a flow diagram that illustrates an example of a technique for oxidizing a porous, carbon-containing material using a fuel and an oxidizing agent.

FIG. 2 is a flow diagram that illustrates an example of a technique that may be performed using the system to oxidize porous, carbon-containing material 32. Although the technique of FIG. 2 is described with reference to the system of FIG. 1, in other examples, the technique of FIG. 2 may be performed using other systems, which may include additional, fewer, or different components than the system of FIG. 1.

The technique of FIG. 2 includes exposing carbon-containing material 32 to a fuel and an oxidizing agent (42). To expose porous, carbon-containing material 32 to the fuel and the oxidizing agent, a mixture of pressurized air and fuel is introduced to sample container 28 through sample container inlet 24. The concentration of fuel in the mixture is controlled by the relative flow rates of pressurized air through first flow controller 14a and second flow controller 14b. In some examples, the pressurized air flowing through fuel source outlet 22 is saturated with fuel vapor. This may allow more precise control of the amount of fuel in the mixture introduced to sample container 28, as the amount of fuel per volume of pressurized air in fuel source outlet 22 will be known based on the fuel vapor saturation concentration. In other examples, the pressurized air flowing through fuel source outlet 22 may not be saturated with fuel vapor.

In some examples, a fraction of pressurized air from fuel source outlet 22 may be less than about 2.5 volume percent (vol. %) of the mixture introduced to sample container 28. For example, the fraction of pressurized air from fuel source outlet 22 may be between 0.025 vol. % and about 2.5 vol. %, such as about 0.25 vol. %, of the mixture introduced to sample container 28. In some examples, the fuel may include octane, and the fraction of pressurized air saturated with octane from fuel source outlet 22 may be between 0.025 vol. % and about 2.5 vol. %, such as about 0.25 vol. %, of the mixture introduced to sample container 28.

The technique of FIG. 2 also includes allowing porous, carbon-containing material 32 to adsorb at least some of the fuel (44). When carbon-containing material 32 is a microporous material, carbon-containing material 32 may adsorb fuel in pores near a bulk surface of carbon-containing material 32, and may or may not adsorb fuel within interior pores (i.e., pores not near the bulk surface) of carbon-containing material 32.

When carbon-containing material 32 is a mesoporous material, carbon-containing material 32 may adsorb at least some of the fuel at any temperature; however, at higher temperatures, such as temperature above a combustion temperature of the fuel, adsorption of the fuel may be limited to regions of carbon-containing material 32 near a bulk surface of the carbon-containing material 32. When the temperature of porous, carbon-containing material 32 is lower, such as below temperatures at which combustion of the fuel occurs, the fuel may adsorb to porous, carbon-containing material 32 at regions further from the bulk surface of carbon-containing material, such as substantially throughout the thickness of porous, carbon-containing material 32.

Using heat source 30, the temperature of porous, carbon-containing material 32 is then raised above the combustion temperature of the fuel for a period of time, which combusts the adsorbed fuel (46). It is currently understood that this causes combustion of the adsorbed fuel, which oxidizes the portions of porous, carbon-containing material 32 adjacent to the adsorbed fuel. Hence, in examples in which fuel is adsorbed throughout the thickness of carbon-containing material 32, oxidation may occur throughout the thickness of carbon-containing material 32. On the other hand, if fuel adsorbs substantially only in pores adjacent to a bulk surface of carbon-containing material 32, such as in a microporous carbon-containing material 32, oxidation may only occur adjacent to the bulk surface of carbon-containing material 32. Oxidation occurring in micropores adjacent to a bulk surface of carbon-containing material 32 may seal the microporosity of carbon-containing material adjacent to the bulk surface of the carbon-containing material 32.

In some examples, a single heating/combustion step may lead to heterogeneous oxidation of porous, carbon-containing material 32 throughout the thickness of porous, carbon-containing material 32, e.g., due to heterogeneous combustion throughout the thickness of porous, carbon-containing material 32. Hence, in some examples, such as when porous-carbon containing material 32 is a mesoporous material, the temperature of porous, carbon-containing material 32 may be repeatedly cycled between a lower temperature and a higher temperature (the "YES" branch of decision block 48). In some examples, both the lower temperature and the higher temperature are above the combustion temperature of the fuel. In other examples, the lower temperature may be below the combustion temperature of the fuel and the higher temperature may be above the combustion temperature of the fuel.

For example, porous, carbon-containing material 32 may be maintained at the lower temperature, during which time the fuel adsorbs to the porous, carbon-containing material 32 with minimal or no combustion. Porous, carbon-containing material 32 then may be heated using heat source 30 to a higher temperature (above the combustion temperature of the fuel), which initiates the combustion reaction and oxidizes portions of porous, carbon-containing material 32 to which the fuel is adsorbed. After a predetermined time, porous, carbon-containing material 32 may be cooled to the lower temperature (which may be below the combustion temperature of the fuel), and more fuel may be adsorbed to porous, carbon-containing material 32. This cycle may be repeated a selected number of times to achieve substantially homogeneous oxidation throughout the thickness of porous, carbon-containing material 32. For example, the cycle may be repeated at least two times, such as eight times. When no additional heating cycles are to be performed, the technique ends (the "NO" branch of decision block 48).

The temperature to which porous, carbon-containing material 32 is heated and the time for which porous, carbon-containing material 32 is heated to the temperature above the combustion temperature of the fuel may be selected to control the extent of combustion of the fuel, and thus, the oxidation of porous, carbon-containing material 32. For example, combustion proceeds more rapidly at higher temperatures (above the combustion temperature) than lower temperatures (above the combustion temperature). Because of this, in some examples in which porous, carbon-containing material 32 is heated to higher temperatures above the combustion temperature of the fuel, porous, carbon-containing material 32 may be heated for a shorter period of time.

In some examples, to improve uniformity of oxidation throughout the thickness of porous, carbon-containing material 32, porous, carbon-containing material 32 may be heated to relatively high temperatures for relatively short periods of time. This may reduce nonuniform oxidation that may occur due to differences in vapor adsorption throughout the thickness of the porous, carbon-containing material 32.

In other examples, porous, carbon-containing material 32 may be heated and cooled in a plurality of thermal cycles at a relatively low temperature above the combustion temperature of the fuel. This may help maintain a relatively uniform fuel concentration throughout the thickness of porous, carbon-containing material 32 throughout the combustion cycles.

In some examples, the technique of FIG. 2 may result in substantially homogeneous oxidation of a porous, carbon-containing material 32 including mesopores. For example, the carbon concentration within a porous, carbon-containing material 32 including mesopores, may vary by no more than a factor of 10 throughout the thickness of the carbon-containing material 32. In other words, within the porous, carbon-containing material 32 including mesopores, the lowest concentration of carbon is within a factor of 10 of the highest concentration of carbon. In some examples, the carbon concentration may vary by less than a factor of 5 or even less than a factor of 2 within the porous, carbon-containing material 32 including mesopores.

EXAMPLES

Figure 3:
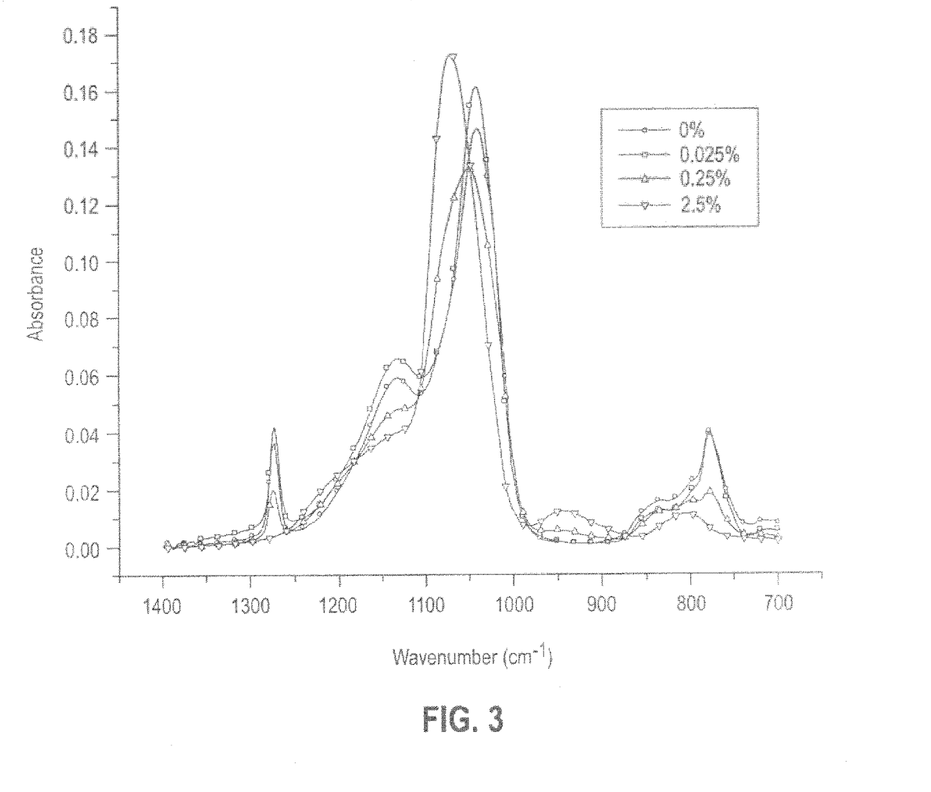
FIG. 3 is a line diagram illustrating a Fourier transform infrared spectroscopy (FTIR) spectrum of silsesquioxane films calcined at 450° C. in the presence of different volume percentages of octane vapor-saturated air.

FIG. 3 is a line diagram illustrating a Fourier transform infrared spectroscopy (FTIR) spectrum of silsesquioxane films calcined at 450° C. in the presence of different volume percentages of octane vapor-saturated air. The volume percentages of octane vapor-saturated air included 0 vol. % (squares), 0.025 vol. % (circles), 0.25 vol. % (upward triangles), and 2.5 vol. % (downward triangles). By varying the volume percentage of octane vapor-saturated air, the overall oxidation level of the silsesquioxane films can be controlled. FIG. 3 illustrates that carbon is removed from the film in the presence of octane vapor, as the peak at 1275 $cm^{-1}$ is smaller at increasing volume fractions of octane vapor-saturated air. This indicates increasing amounts of oxidation with increasing concentrations of octane vapor. Analysis of the 1000 $cm^{-1}$ to 1200 $cm^{-1}$ region of the spectrum allows for the determination of the silicon oxygen network. In the absence of octane vapor, the Si—O peak occurs at approximately 1030 $cm^{-1}$. However, the addition of octane during calcination shifts this peak to 1080 cm-1, consistent with formation of thermal oxide.

Figure 4A:
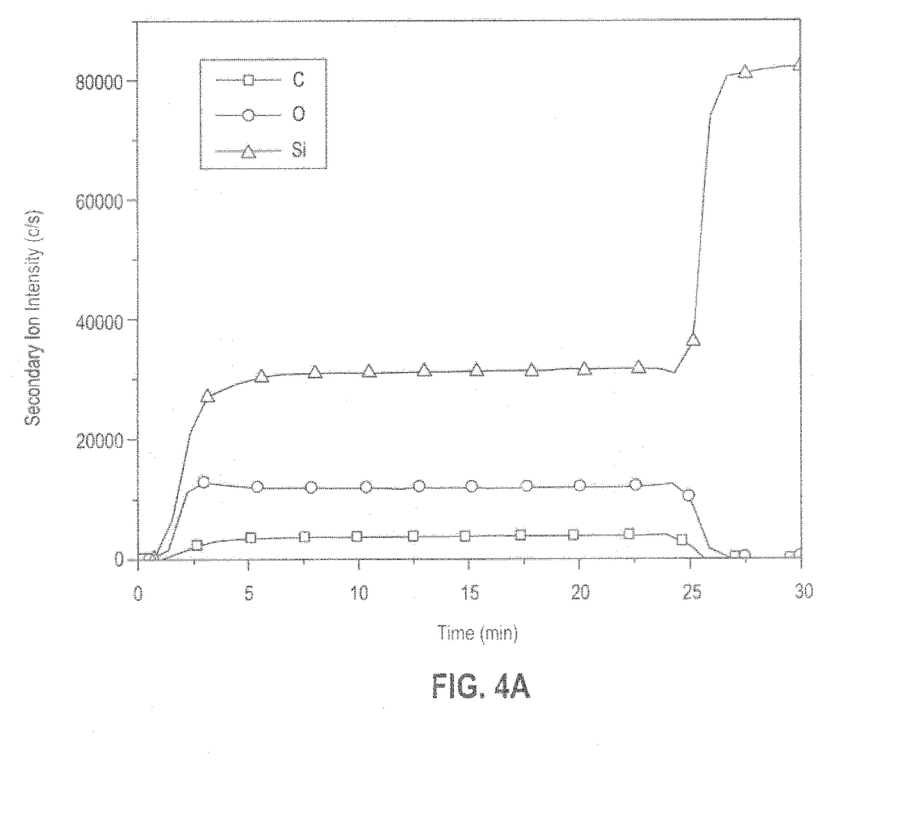
FIGS. 4A-4D are secondary ion mass spectroscopy plots of elemental composition as a function of depth for silsesquioxane films calcined at 450° C. in the presence of different volume percentages of octane vapor-saturated air.
Figure 4B:
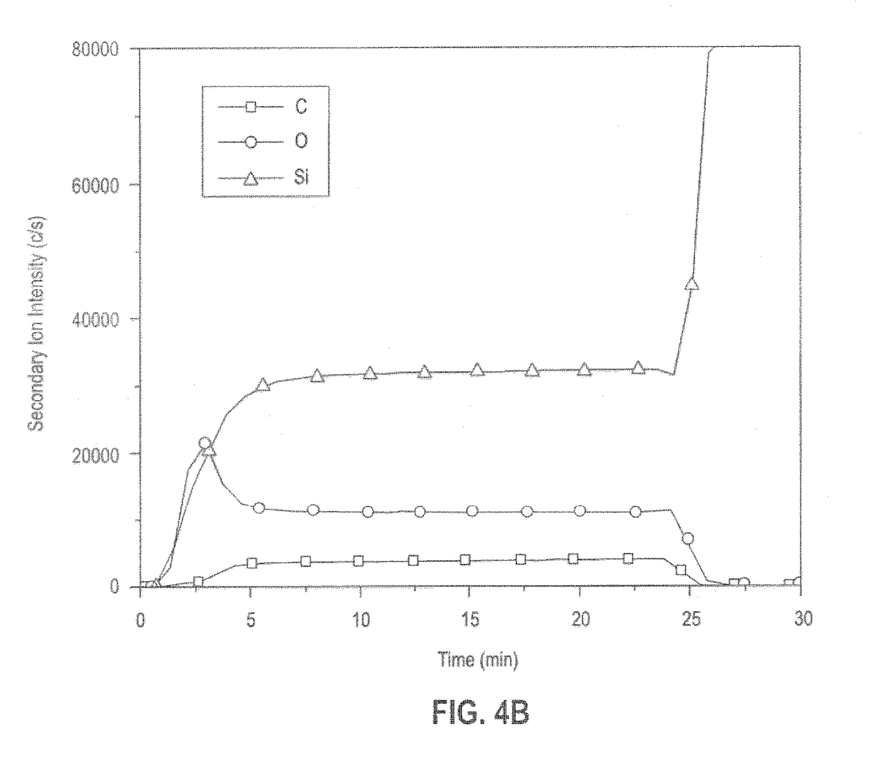
Figure 4C:
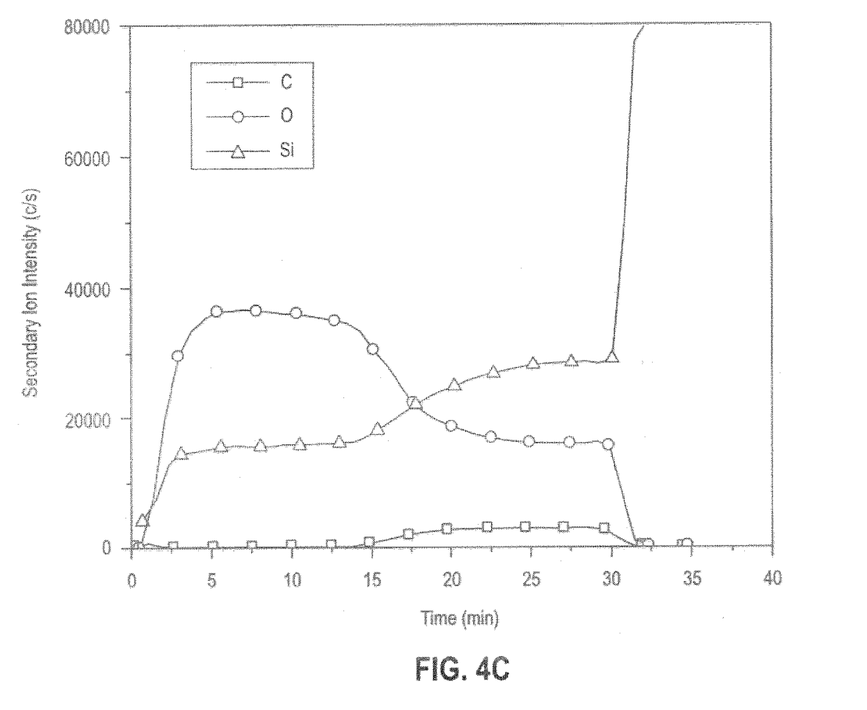
Figure 4D:
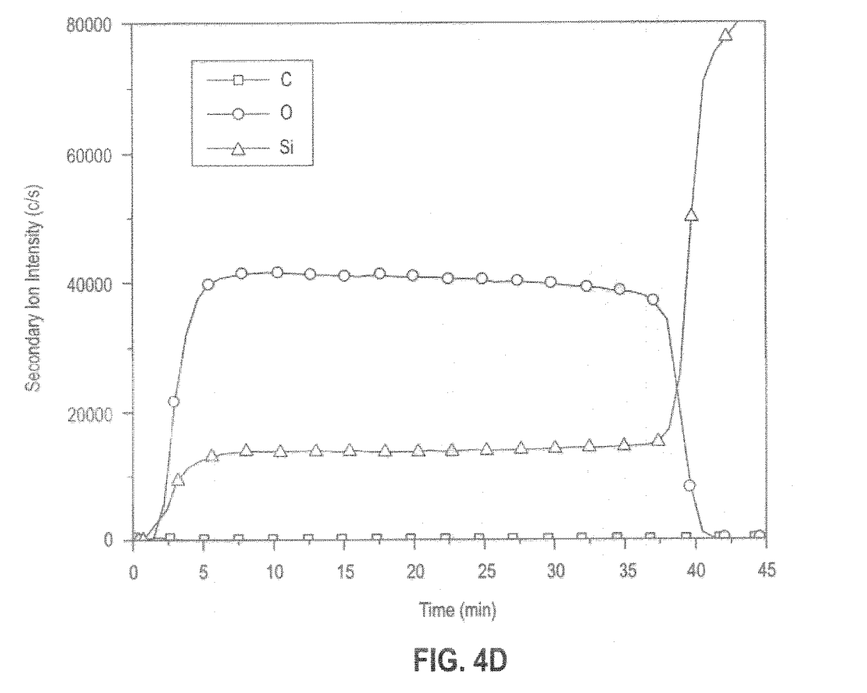

FIGS. 4A-4D are secondary ion mass spectroscopy (SIMS) plots of elemental composition as a function of depth for silsesquioxane films calcined at 450° C. in the presence of different volume percentages of octane vapor-saturated air. FTIR results, shown in FIG. 3, cannot provide a complete view of the oxidation of the porous silsesquioxane films to determine whether this process occurs at the bulk surface of the film or uniformly throughout the porous film. SIMS allows examination of the elemental composition as a function of depth for the calcined silsesquioxane films. In the absence of octane (FIG. 4A), the elemental composition remains constant throughout the film, clearly showing the presence of silicon, oxygen, and carbon throughout the film. With the addition of octane, there is a decrease of carbon and an increase of oxygen consistent with the FTIR results; however, SIMS analysis shows oxidation does not occur uniformly in the film for some octane-vapor saturated air volume percentages. At the lowest octane vapor-saturated air volume percentage (0.025 vol. %) as shown in FIG. 4B, oxidation has only occurred at the bulk surface of the film. Increasing the octane vapor-saturated air volume percentage to 0.25 vol. % (FIG. 4C) causes the oxidation to penetrate further into the porous film. At 2.5 vol. % octane vapor-saturated air (FIG. 4D), the entire film has become oxidized. The process as shown does not uniformly oxidize the film, generating an oxidized layer at the outer interface similar to plasma and UV/ozone.

Figure 5A:
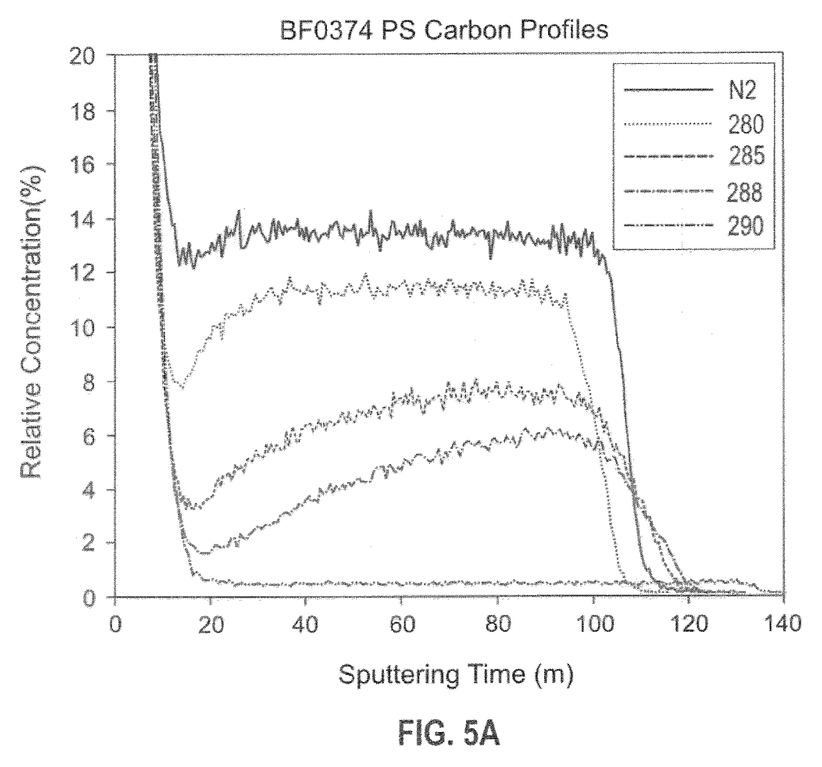
FIGS. 5A and 5B are line diagrams illustrating carbon concentration for silsesquioxane films calcined at different temperatures in the presence of nitrogen or octane vapor.
Figure 5B:
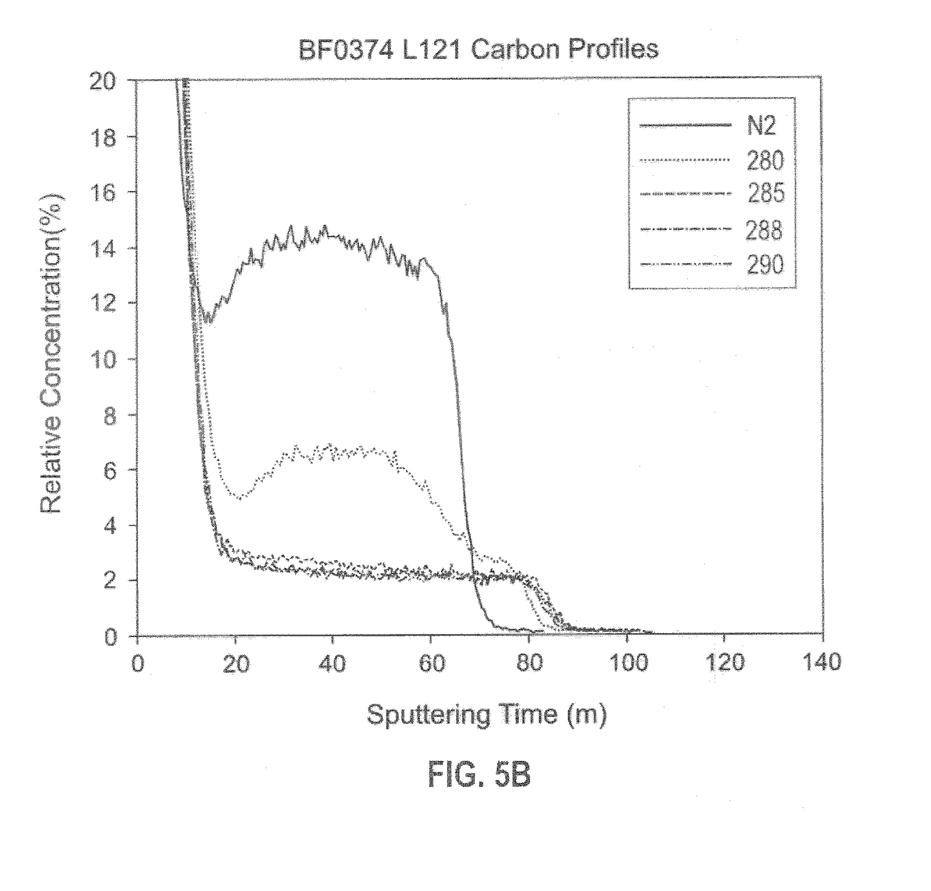

FIGS. 5A and 5B are line diagrams illustrating carbon concentration for silsesquioxane films calcined at different temperatures in the presence of nitrogen or octane vapor. The silsesquioxane film from which the results shown in FIG. 5A were measured included poly(styrene-b-4-vinyl pyridine) (PS) polymeric organic pore generator. The block molecular weights were 19,000 g/mol for polystyrene and 5,000 g/mol for poly-4-vinyl pyridine. The silsesquioxane film from which the results shown in FIG. 5B were measured included an ethylene oxide/propylene oxide block copolymer organic pore generator available under the trade designation Pluronic® L 121 (L121) from BASF Corp., Florham Park, N.J. The results of these studies are shown in FIGS. 5A and 5B, with the temperature listed in the figure legend representing the highest temperature reached in the cycle. Each sample was cycled 8 times to the upper temperature. At higher temperatures, combustion occurs with a higher probability, and therefore, more oxidation occurs. As can be seen in FIGS. 5A and 5B, the carbon content of the silsesquioxane films can be controlled, producing a relatively uniform concentration throughout the thickness of the film. In the silsesquioxane films oxidized at higher temperatures (e.g, 285° C. and 288° C.), the carbon content is slightly lower at the interface. The samples heated to higher temperatures spend more time at combustion temperatures, which may lead to more octane vapor adsorbing from the gas phase and combusting at the interface near the bulk surface of the silsesquioxane film. However, these effects may be mitigated. For example, using a lower temperature and more combustion cycles may yield a more uniform carbon profile even for higher degrees of oxidation.

Figure 6:
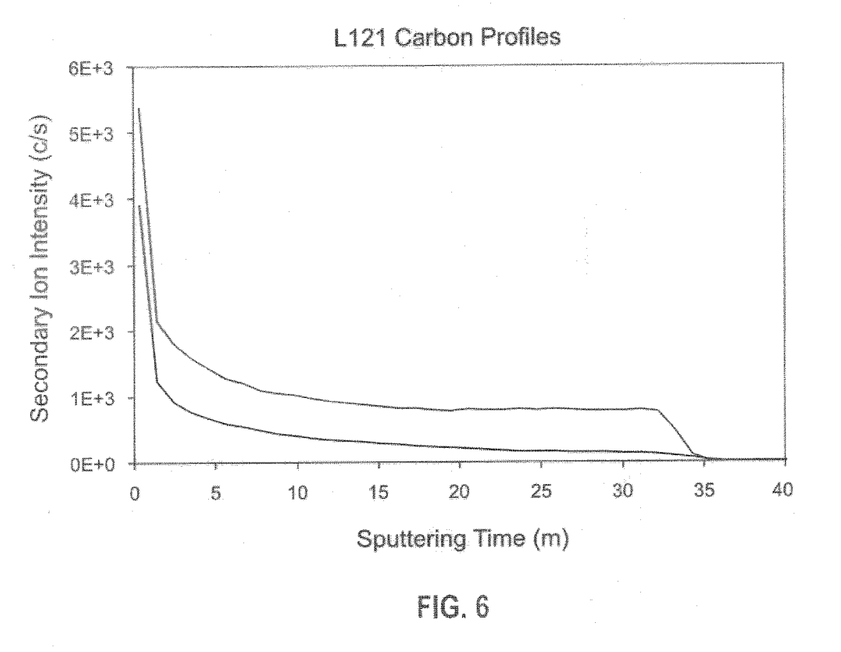
FIG. 6 is a line diagram illustrating the carbon profile before and after surface functionalization of an oxidized silsesquioxane film.

FIG. 6 is a line diagram illustrating the carbon profile before and after surface functionalization of an oxidized silsesquioxane film. Surface functionalization using silane chemistry is used in many applications. The film was prepared with 40 wt. % L121 organic pore generator and fully oxidized using the techniques described herein. To determine whether the surface of this oxidized film had silanols available for functionalization using silane chemistry, the oxidized film was exposed to N,O-bis(trimethylsilyl)acetamide. After exposure to the N,O-bis(trimethylsilyl)acetamide, the carbon content of the film increased and the surface became hydrophobic (as indicated by a contact angle with water of 114 degrees), consistent with functionalization by trimethylsilyl.

Table 1 illustrates results of oxidizing a mesoporous, carbon-containing sample (an electrochemical grade glassy carbon with mirror finish available from Tokai Carbon USA, Hillsboro, Oreg.) using nitrous oxide as an oxidizing agent. Octane was used as the fuel at a concentration of 2.5 wt. % octane. The oxidizing reaction was carried out at about 450° C. for about 2 hours. The first sample was a methylsilsesquioxane-based sample, the second included a poly(styrene-b-4-vinyl pyridine) (PS) polymeric organic pore generator, and the third sample included an ethylene oxide/propylene oxide block copolymer organic pore generator available under the trade designation Pluronic® L 121 (L121) from BASF Corp., Florham Park, N.J. As shown for samples including each of the three porogens, oxidizing using nitrous oxide and octane resulted in a reduced contact angle with water, indicating oxidation of the mesoporous, carbon-containing sample.

TABLE 1

| Sample | Contact Angle (Degrees) | |
|---|---|---|
| | N$_2$O only | N$_2$O plus Octane |
| MSSQ | 100 | 35 |
| PS | 103 | 51 |
| L121 | 109 | 57 |

Table 2 illustrates results of oxidizing a mesoporous carbon black sample using oxygen as an oxidizing agent, with and without 2.5 wt. % diethyl ether as a fuel. The oxidizing reaction was carried out at about 200° C. for about 30 minutes. As shown in Table 2, oxidizing using oxygen and diethyl ether resulted in a reduced contact angle with water, indicating oxidation of the mesoporous, carbon black sample.

TABLE 2

| | Contact Angle (Degrees) | |
|---|---|---|
| | Oxygen only | Oxygen plus Diethyl Ether |
| Carbon Black | 65 | 35 |

Figure 7:
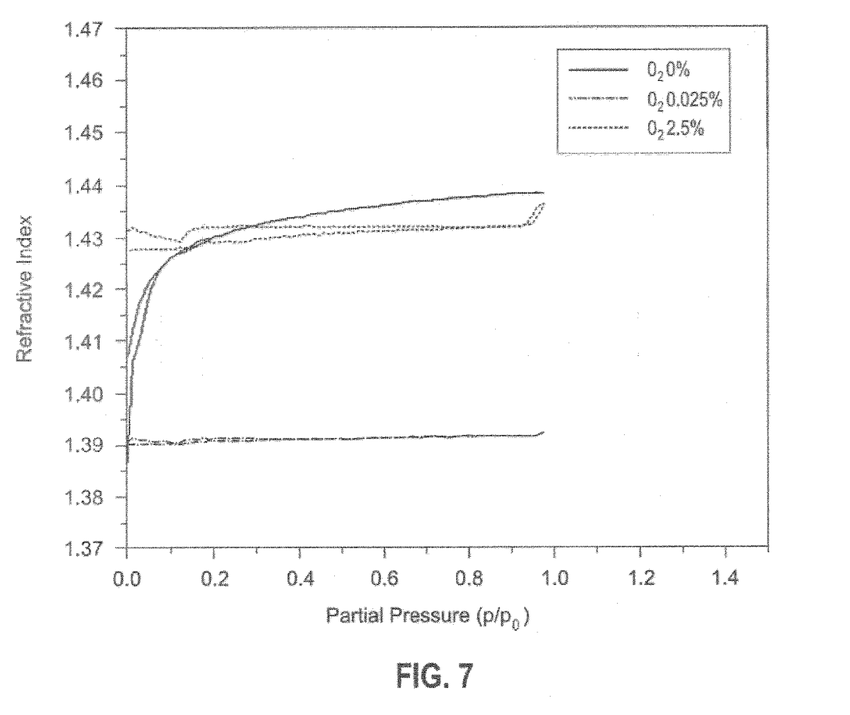
FIG. 7 is a plot of refractive index versus toluene partial pressure collected using toluene adsorption ellipsometric porosimetry.

FIG. 7 is a plot of refractive index versus toluene partial pressure collected using toluene adsorption ellipsometric porosimetry for a methylsilsequioxane-based sample. Toluene adsorption ellipsometric porosimetry allows determination of the change in pore size of materials in various environments at 450° C. The nitrogen cured films showed only microporosity and the addition of octane to the vapor while curing with nitrogen did nothing to change the toluene adsorption profile (data not shown in FIG. 7). In fact, for samples cured using nitrogen with or without octane, the adsorption profiles were identical to the adsorption profile of the film cured with oxygen and without octane shown in FIG. 1.

Films heated to 450° C. in the oxygen and octane environment did not uptake any toluene during the toluene adsorption ellipsometric porosimetry measurement. FIG. 7 shows the refractive index versus toluene partial pressure for samples cured with oxygen only, samples cured with oxygen and 0.025 vol. % octane, and samples cured with oxygen and 2.5% octane. The constant refractive index versus toluene partial pressure for the samples cured in the presence of octane indicates that the pore dimension is smaller than the dimension of the toluene molecules and no toluene is being adsorbed.

Various examples have been described. These and other examples are within the scope of the following claims.

The invention claimed is:
1. A method, comprising:
  passing a first pressurized air stream through a fuel source to saturate the first pressurized air stream with fuel vapor and form a saturated air stream;
  combining the saturated air stream with a second pressurized air stream to form a third pressurized air stream;
  exposing a porous, carbon-containing material to the third pressurized air stream and an oxidizing agent to allow the porous, carbon-containing material to adsorb at least some of the fuel vapor;
  while continuing to expose the porous, carbon-containing material to the third pressurized air stream and the oxidizing agent, heating the porous, carbon-containing material to a temperature at which combustion of the adsorbed fuel vapor occurs to combust the adsorbed fuel vapor, so that the porous, carbon-containing material is substantially homogeneously oxidized throughout its thickness;
  after heating the porous, carbon-containing material to the temperature at which combustion of the adsorbed fuel vapor occurs, and while continuing to expose the porous, carbon-containing material to the third pressurized air stream and the oxidizing agent, cooling the heated porous, carbon-containing material to control the extent of combustion; and while continuing to expose the porous, carbon-containing material to the third pressurized air stream and the oxidizing agent, repeating the heating and cooling steps to promote absorption and uniform distribution of the fuel vapor and the oxidizing agent throughout the porous, carbon-containing material.

2. The method of claim 1, wherein the porous, carbon-containing material comprises a porous, organosilicate material.

3. The method of claim 1, wherein the thickness of the porous, carbon-containing material is less than about 1 micrometer.

4. The method of claim 2, wherein the porous, organosilicate material is selected from the group consisting of silsesquioxanes, silicates, siloxanes, crosslinked siloxanes, carbosilanes, crosslinked carbosilanes, and cyclic siloxanes.

5. The method of claim 2, wherein the porous, organosilicate material includes a substituent selected from the group consisting of hydrogen, alkyls, branched alkyls, cycloalkyls, aromatics, substituted aromatics, polycyclic aromatics, vinyls, and combinations thereof.

6. The method of claim 1, wherein the porous, carbon-containing material comprises porous carbon.

7. The method of claim 1, wherein the porous, carbon-containing material comprises a thin film.

8. The method of claim 1, wherein the oxidizing agent is selected from the group consisting of oxygen, nitrous oxide, and a combination thereof.

9. The method of claim 1, wherein the fuel source is selected from the group consisting of hydrogen, alkyls, branched alkyls, cycloalkyls, aromatics, substituted aromatics, polycyclic aromatics, aliphatic ethers, alkyl aryl ethers, alcohols, ketones, and aldehydes, and combinations thereof.

10. The method of claim 1, wherein heating the porous, carbon-containing material to the temperature at which combustion of the adsorbed fuel vapor occurs comprises using at least one of the following: thermal means, radiation, ultrasonication, and laser heating.

11. The method of claim 1, wherein the combustion of the adsorbed fuel vapor occurs at a temperature of no greater than 300° C.

12. The method of claim 1, wherein the porous, carbon-containing material comprises a mesoporous, carbon-containing material.

13. The method of claim 1, wherein the carbon content of the porous, carbon-containing material varies by less than a factor of 10 throughout the thickness of the porous, carbon-containing material after substantially homogeneously oxidizing the porous, carbon-containing material.

14. A method comprising:

passing a first pressurized air stream through a hydrocarbon source to saturate the first pressurized air stream with hydrocarbon vapor and form a saturated air stream;

combining the saturated air stream with a second pressurized air stream to form a third pressurized air stream; and exposing a silsesquioxane to the third pressurized air stream and an oxidizing agent to allow the silsesquioxane to adsorb at least some of the hydrocarbon vapor;

while continuing to expose the silsesquioxane to the third pressurized air stream and the oxidizing agent, heating the silsesquioxane to a temperature at which combustion of the adsorbed hydrocarbon vapor occurs to combust the adsorbed hydrocarbon vapor;

after heating the silsesquioxane to a temperature at which combustion of the adsorbed hydrocarbon vapor occurs to combust the adsorbed hydrocarbon, vapor and while continuing to expose the silsesquioxane to the third pressurized air stream and the oxidizing agent, cooling the heated silsesquioxane to control the extent of combustion; and while continuing to expose the silsesquioxane to the third pressurized air stream and the oxidizing agent, repeating the heating and cooling of the silsesquioxane to promote absorption and uniform distribution of the hydrocarbon vapor and the oxidizing agent throughout the silsesquioxane, so that the silsesquioxane is substantially homogeneously oxidized throughout its thickness.

15. The method of claim 14, wherein the combustion of the hydrocarbon vapor occurs at a temperature of no greater than 300° C.

16. The method of claim 14, wherein the oxidizing agent is selected from the group consisting of oxygen, nitrous oxide, and combinations thereof.

17. The method of claim 14, wherein the silsesquioxane comprises a thin film.

18. A method comprising:

passing a first pressurized air stream through a fuel source to saturate the first pressurized air stream with fuel vapor and form a saturated air stream;

combining the saturated air stream with a second pressurized air stream to form a third pressurized air stream;

exposing a microporous, carbon-containing material to the third pressurized air stream and an oxidizing agent to allow the microporous, carbon-containing material to adsorb at least some of the fuel vapor; and while continuing to expose the microporous, carbon-containing material to the third pressurized air stream and the oxidizing agent, heating the microporous, carbon-containing material to a temperature at which combustion of the fuel vapor occurs to combust the adsorbed fuel vapor to seal pores of the microporous, carbon-containing material adjacent to its surface.

19. The method of claim 18, wherein the microporous, carbon-containing material comprises a microporous, organosilicate material.

20. The method of claim 18, wherein the microporous, carbon-containing material comprises a microporous silsesquioxane.

21. The method of claim 18, wherein the microporous, carbon-containing material comprises a thin film.

* * * * *